(12) United States Patent
Xiang et al.

(10) Patent No.: US 9,992,164 B2
(45) Date of Patent: Jun. 5, 2018

(54) USER BASED STATELESS IPV6 RA-GUARD

(71) Applicant: SonicWALL US Holdings Inc., Santa Clara, CA (US)

(72) Inventors: Dong Xiang, Shanghai (CN); Zhong Chen, Fremont, CA (US)

(73) Assignee: SonicWALL Inc., Santa Clara, CA (US)

( * ) Notice: Subject to any disclaimer, the term of this patent is extended or adjusted under 35 U.S.C. 154(b) by 60 days.

(21) Appl. No.: 14/996,036

(22) Filed: Jan. 14, 2016

(65) Prior Publication Data

US 2017/0208035 A1 Jul. 20, 2017

(51) Int. Cl.
*G06F 15/16* (2006.01)
*H04L 29/06* (2006.01)
*H04L 29/12* (2006.01)
*H04L 12/749* (2013.01)
*G06F 13/00* (2006.01)

(52) U.S. Cl.
CPC ........ *H04L 63/0236* (2013.01); *H04L 45/741* (2013.01); *H04L 61/6059* (2013.01); *H04L 61/103* (2013.01); *H04L 61/2092* (2013.01)

(58) Field of Classification Search
CPC ............. H04L 63/1416; H04L 63/1408; H04L 63/1441; H04L 63/1458; G06F 21/552
USPC .......................................................... 726/13
See application file for complete search history.

(56) References Cited

U.S. PATENT DOCUMENTS 7,539,191 B1 * 5/2009 Jacobson ............ H04L 63/1441
370/392
2015/0117308 A1 * 4/2015 Kant ...................... H04W 40/12
370/328

* cited by examiner

*Primary Examiner* — Evans Desrosiers
(74) *Attorney, Agent, or Firm* — Polsinelli LLP

(57) ABSTRACT

The present disclosure relates to an apparatus, a method, and a non-transitory computer readable storage medium for filtering routing assignment (RA) messages in a computer network. Methods, non-transitory computer readable storage medium, and apparatus consistent with the present disclosure may receive an RA message, extract information included in an RA message when identifying whether that particular RA messages should be forwarded or blocked. Information used to identify when to forward or block particular RA messages may be related to information that identifies a user of a computer or that identifies a computer that sends RA messages over a computer network.

20 Claims, 4 Drawing Sheets

USER BASED STATELESS IPV6 RA-GUARD

BACKGROUND OF THE INVENTION

Field of the Invention

The present invention is generally directed to limiting unwanted message traffic in a computer network. More specifically, the present invention filters message traffic in a computer network eliminating unwanted messages according to one or more policy rules.

Description of the Related Art

Routers and computing devices in computer networks today broadcast router advertisements (RAs) as part of an auto-configuration process of a network. RAs are messages that are commonly used in internet protocol version 6 (IPv6) networks. RAs provide information that may be used to configure an IPv6 network. In certain instances, an excessive number of RAs appear on a computer network consuming excessive amounts of network bandwidth, sometimes causing hosts on the computer network to fail.

Currently IPv6 networks include router advertisement guards (RA-guards) that examine RAs on the computer network when identifying whether specific RAs should be blocked or forwarded. A first type of RA-guard implemented in IPv6 networks today are referred to as statefull RA-guards that dynamically acquire information when identifying legitimate router assignment (RA) senders. Once a statefull RA-guard identifies legitimate RA senders, the statefull RA-guard stores this information in memory. An RA-guard will not block RAs sent from legitimate RA senders.

A second type of RA-guard used in IPv6 networks today are stateless RA-guards. Stateless RA-guards examine information contained in the RA or information relating to a device configuration when identifying whether a particular RA should be blocked or forwarded. In certain instances a stateless RA-guard is referred to as a level 2 device (L2-device). Information used by a stateless RA-guard sometimes includes a link layer address of a sender, a port on which the RA was received, or a source internet protocol (IP) address. The information used by a stateless RA-guard may be contained in a second layer (L2) or third layer (L3) of an RA message.

While statefull and stateless RA-guards provide benefits to a computer network, they do not provide adequate protection to prevent bogus RAs from being forwarded around in a computer network. One source of RAs are personal devices that connect to a computer network using wireless communications. Such personal devices connect to a computer network when individuals bring their own device (BYOD) to work. As such, personal devices may disturb computer networks by sending too many RAs to the network.

What are needed are new forms of RA-guards that protect computer networks from bogus RAs. This is especially true when a network allows personal devices to connect to the network.

SUMMARY OF THE PRESENTLY CLAIMED INVENTION

The presently claimed invention relates to an apparatus, a method, and a non-transitory computer readable storage medium for guarding a computer network from unwanted or bogus router assignment (RA) messages. A method of the presently claimed invention may receive an RA message, extract information included in the RA message from the RA message, identify that the extracted information in the RA message corresponds to a stored record, identify that information in the stored record corresponds to at least one of a first particular computing device or a first user, and identify that RA messages from that particular computing device or from a computing device associated with the first user are allowed to be forwarded to another computing device at the computing network. After the method of the presently claimed invention identifies that the RA message may be forwarded, the received RA message may be forwarded to at least one other computing device.

When the presently claimed invention is implemented as a non-transitory computer readable storage medium, the method may be implemented using a processor executing instructions out of a memory. Here again the method may receive an RA message, extract information included in the RA message from the RA message, identify that the extracted information in the RA message corresponds to a stored record, identify that information in the stored record corresponds to at least one of a first particular computing device or a first user, and identify that RA messages from that particular computing device or from a computing device associated with the first user are allowed to be forwarded to another computing device at the computing network. After the method of the presently claimed invention identifies that the RA message may be forwarded, the received RA message may be forwarded to at least one other computing device.

When the presently claimed invention is implemented in an apparatus, the apparatus may include one or more network interfaces, a memory, and a processor that executes instructions out of the memory. In such instances an RA message is received over a network interface at a computer network. The processor executing instructions out of the memory may extract information included in the RA message from the RA message, identify that the extracted information in the RA message corresponds to a stored record, identify that information in the stored record corresponds to at least one of a first particular computing device or a first user, and identify that RA messages from that particular computing device or from a computing device associated with the first user are allowed to be forwarded to another computing device at the computing network. After identifying that the received RA message may be forwarded, the received RA message may be forwarded to at least one other computing device.

DETAILED DESCRIPTION

The present disclosure relates to an apparatus, a method, and a non-transitory computer readable storage medium for managing the allocation of available network bandwidth in a computer network. Methods consistent with the present disclosure may combine features and functions that are commonly used in computer networking with new features and functions of the present disclosure.

The present disclosure also relates to an apparatus, a method, and a non-transitory computer readable storage medium for filtering routing assignment (RA) messages in a computer network. Methods, non-transitory computer readable storage medium, and apparatus consistent with the present disclosure may receive an RA message, extract information included in an RA message when identifying whether that particular RA messages should be forwarded or blocked. Information used to identify when to forward or block particular RA messages may be related to information that identifies a user of a computer or that identifies a computer that sends RA messages over a computer network.

Table 1 illustrates exemplary information that may be included in an authenticated device table. Table 1 includes columns of information cross referencing device user identifier (ID) with a machine identifier number (MAC) and a device internet protocol address. Table 1 also includes a timestamp identifying when by date and time user credentials were authenticated. Note that John has two different machines using two different IP addresses that have been authenticated by the network. Note also that Eric's credentials were verified at 7:23 am on Jul. 22, 2015 he was connecting a machine with MAC of D4-BE-D9-4B-7C-A6 using device IP address of 2001:470:80b7:670a:200.

Figure 1:
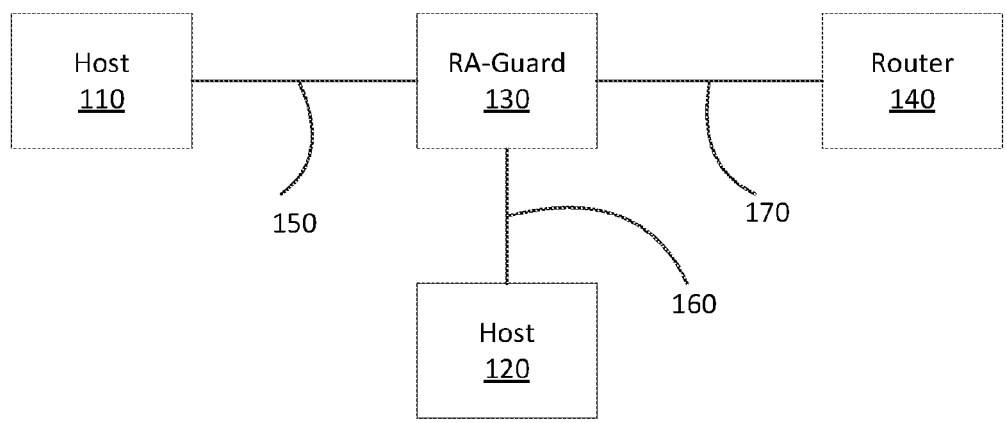
FIG. 1 illustrates an exemplary network environment that includes a routing assignment guard (RA-Guard) that filters router assignment (RA) messages received by the RA-guard.

FIG. 1 includes a first host computer 110, a second host computer 120, an RA-Guard 130, and a router 140. Connections 150, 160, and 170 are computer network interconnections where connection 150 connects the first host computer 110 with the RA-guard 130. Connection 160 connects the second host computer 120 with the RA-Guard 130 and connection 170 connects the RA-Guard 130 with router 140.

Figure 2:
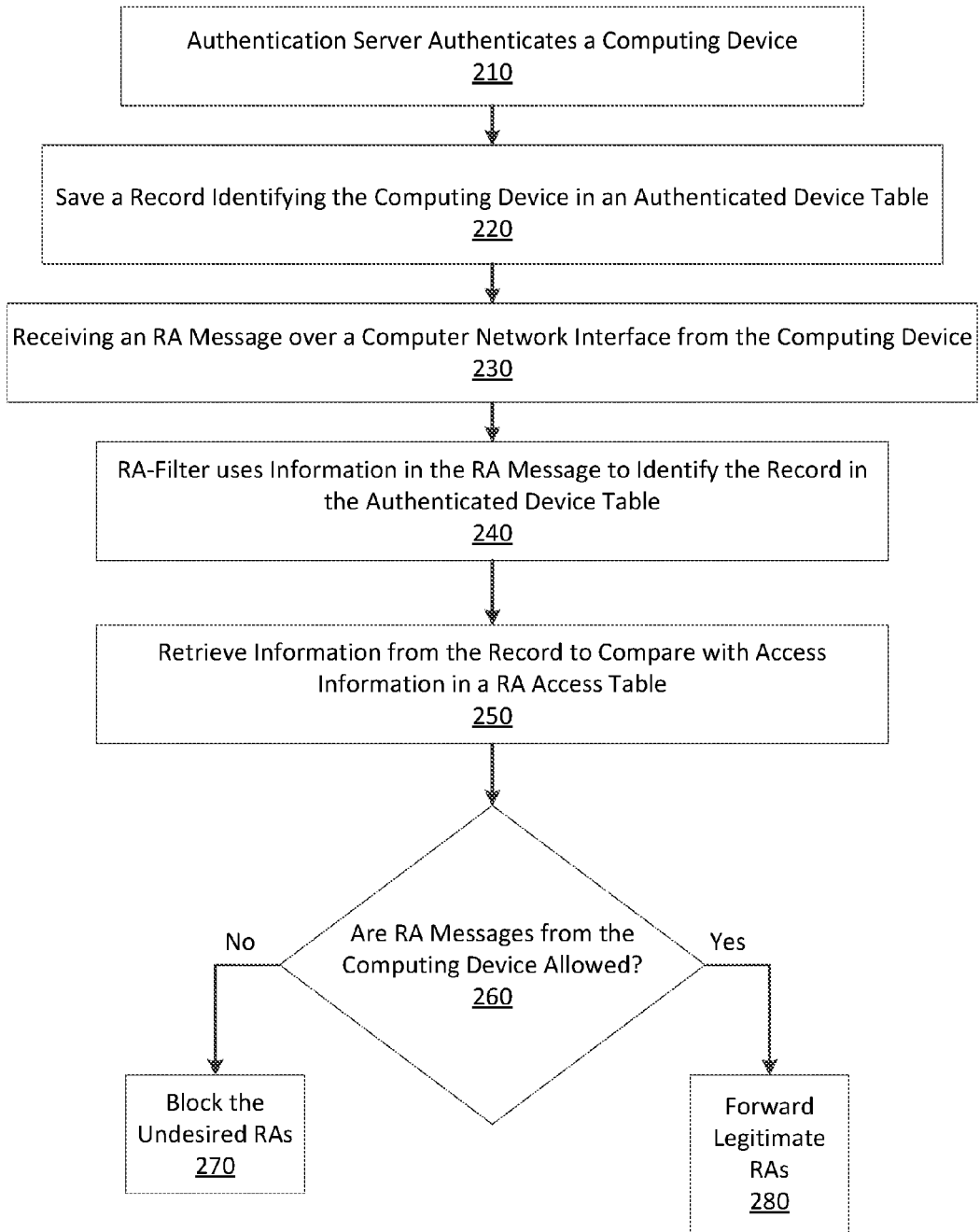
FIG. 2 illustrates an exemplary flow chart that includes actions that may be performed by an RA-Guard that filters received RA messages.

FIG. 2 illustrates an exemplary flow chart that includes actions that may be performed by an RA-Guard that filters received RA messages. In step 210 an authentication server in or associated with the RA-Guard authenticates a computing device or a user of a computing device. Such authentications may be performed after receiving login information of a user where the login information may include a username and password.

After user credentials have been authenticated, a record identifying the computing device associated with the credentials may be stored in an authenticated device table in step 220. The authenticated device table may include information consistent with information included in Table 1. As such, the record may include a device user identifier (ID), a machine identifier (MAC) of a computing device associated with the user ID, an internet protocol (IP) address assigned/used by the computing device associated with the user ID, and a timestamp that identifies when the computing device was authenticated. A computing device associated with a

TABLE 1

Authenticated Device Table and Sample Records

| Device's User ID | Device's MAC | Device's IP | Timestamp of Authenticated |
|---|---|---|---|
| John | 44-6D-57-CA-3C-26 | 2001:470:80b7:670a:4f6:9b94:7054:f779 | 22 Jul. 2015 09:57:52 |
| John | 44-6D-57-CE-03-33 | 2001:470:80b7:670a:7894:b139:842a:bb70 | 22 Jul. 2015 10:05:52 |
| Eric | D4-BE-D9-4B-7C-A6 | 2001:470:80b7:670a::200 | 22 Jul. 2015 10:07:23 |
| Martin | 08-00-27-00-98-16 | 2001:470:80b7:670a:1523 | 22 Jul. 2015 10:09:45 |

Table 2 illustrates an exemplary user based router advertisement (RA) access table with sample records. Note that for user ID John incoming router advertisements (RAs) are not allowed, yet for Eric and Martin incoming RAs are allowed. When an RA associated with a user of a computing device is received and when the RA access table indicates that RAs from computing devices associated with that user are allowed, the RA-Guard will forward the received RA to other computing devices in the computer network. Conversely when an RA associated with a second user is received from a computer that is associated with the second user and when the RA table indicates that RAs received from the computer associated with the second user are not allowed, the RA-Guard will not forward (i.e. will block) the RA received from the computer associated with the second user.

TABLE 2

User based RA Access Table and Sample Records

| User ID | Incoming RA Allowed |
|---|---|
| John | No |
| Eric | Yes |
| Martin | Yes |

FIG. 1 illustrates an exemplary network environment that includes a routing assignment guard (RA-Guard) that filters router assignment (RA) messages received by the RA-guard.

user may communicate over either a wireless or a wired network communication interface with a computer network.

Step 230 of FIG. 2 is where the RA-Guard receives an RA message from a computing device over a computer network. After receiving the RA message the RA-Guard may filter the received RA message with an RA-Filter at the RA-Guard in step 240 of FIG. 2. The RA-Filter may use information contained in the received RA message that corresponds to a record in the authenticated device table. After identifying that the received RA message is associated with a record in the authenticated device table, the RA-Filter may then retrieve information from the record and compare that information with information stored in an RA access table in step 250.

Next determination step 260 identifies whether RA messages from the computing device that sent the RA message are allowed to be forwarded to other computing devices in the network. When RA messages from that computing device are not allowed, the RA-Guard will block the received RA message in step 270 of the flow chart of FIG. 2. When RA messages from that computing device are allowed, the RA-Guard will forward the received RA message to other computing devices in the computer network in step 280.

Information used by an RA-guard of the present disclosure may include a link layer address of a sender, a port on which the RA was received, or a source internet protocol (IP) address. This information may be contained in a second layer (L2) or third layer (L3) of a received RA message.

Figure 3:
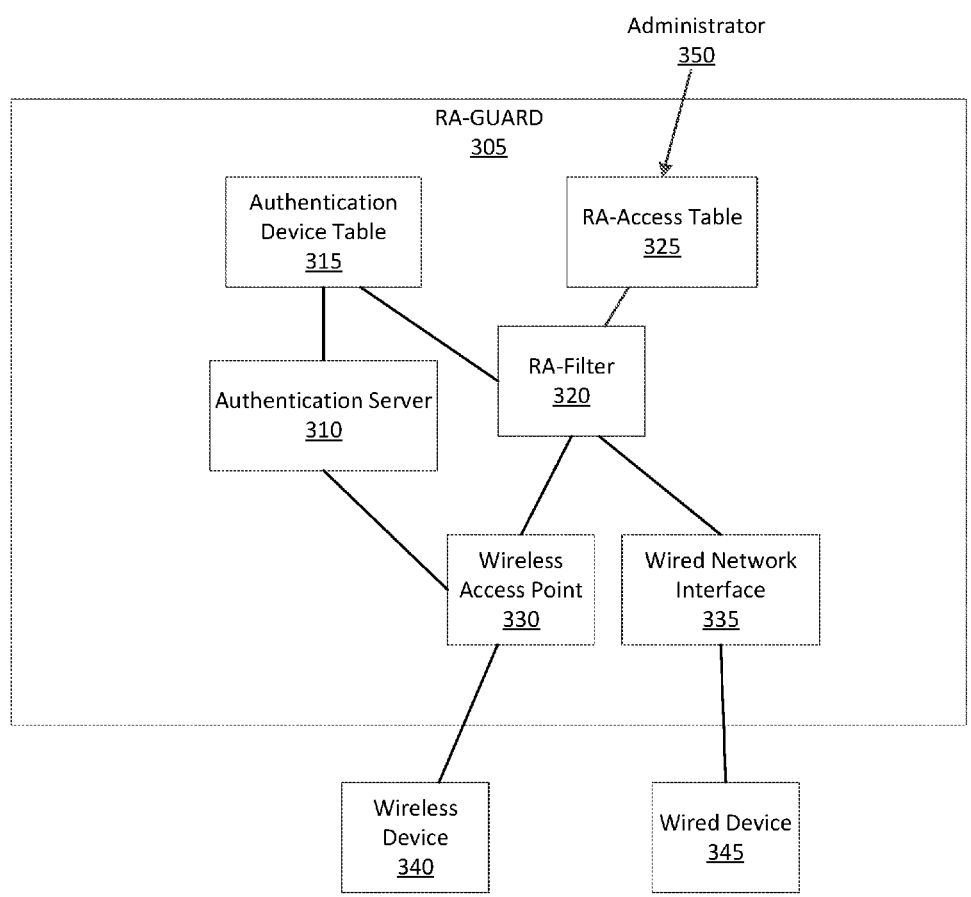
FIG. 3 illustrates exemplary components that may be included in an RA-Guard that may implement functions consistent with the present disclosure.

FIG. 3 illustrates exemplary components that may be included in an RA-Guard that may implement functions consistent with the present disclosure. FIG. 3 includes a wireless device 340 and a wired device 345 that may send RA messages to the RA-Guard 305 of FIG. 3. The RA-Guard 305 of FIG. 3 includes an authentication server 310, an authentication device table 315, an RA-Filter 320, an RA-Access table 325, a wireless access point 330, and a wired network interface 335.

The components illustrated as being included in the RA-Guard 305 of FIG. 3 may be included within a single computing device or may be included in more than one computing device that communicate with a computing device implementing the function of an RA-filter of the present disclosure. While the RA-Guard 305 of FIG. 3 includes a wireless access point, RA-Guards consistent with the present disclosure may not include a wireless access point or a wireless access point may be connected to the RA-Guard 305 using a wired connection.

FIG. 3 also includes an administrator 350 that may configure entries in the RA-Access table 325. In certain instances the RA-Access table 325 may include information consistent with information included in table 2 that cross references a user ID with information that identifies whether RA messages associated with that user ID (or a computer associated with that user ID) are allowed to be forwarded or not.

In operation, a processor at the RA-Guard 305 of FIG. 3 may execute instructions out of memory according to the flow chart of FIG. 2. As such, wireless device 340 may communicate over wireless access point 330 and be authenticated by authentication server 310 where information relating to wireless device 340 may be stored in authentication device table 315. When an RA message from wireless device 340 is received over the wireless access point 330 RA-Filter 320 may access and compare information included in authentication device table 315 and in RA-Access table 325 when identifying whether RA messages received from wireless device 340 may be forwarded to other computing devices in the computer network. When RA messages from wireless device 340 are allowed, the received RA message from wireless device 340 may forward that RA message to wired device 345 over wired network interface 335.

In certain instances RA-Access table 325 may only identify user IDs or computers associated with specific user IDs that are allowed where RAs received from computing devices or that are associated with user IDs that are not listed in the RA-Access table 325 may be blocked. In these instances, the RA-Access table 325 only identifies user IDs or computers from which RA messages will be forwarded.

In certain other instances the content of an RA access table and a authentication device table of the present disclosure may be combined into a single table that includes both authentication information and information that identifies whether RA messages associated with a user or a computing device may be forwarded to other computing devices in the computer network.

In yet other instances, information relating to a time period over which RA messages allowed to be forwarded from a computer associated with a particular user may be stored at a time when credentials associated with that particular user were authenticated. In such instances, RA messages received from the computer associated with that particular user will be forwarded only during the time period. After the time period has expired, RA messages received and that are associated with that particular computer or user will be blocked.

Figure 4:
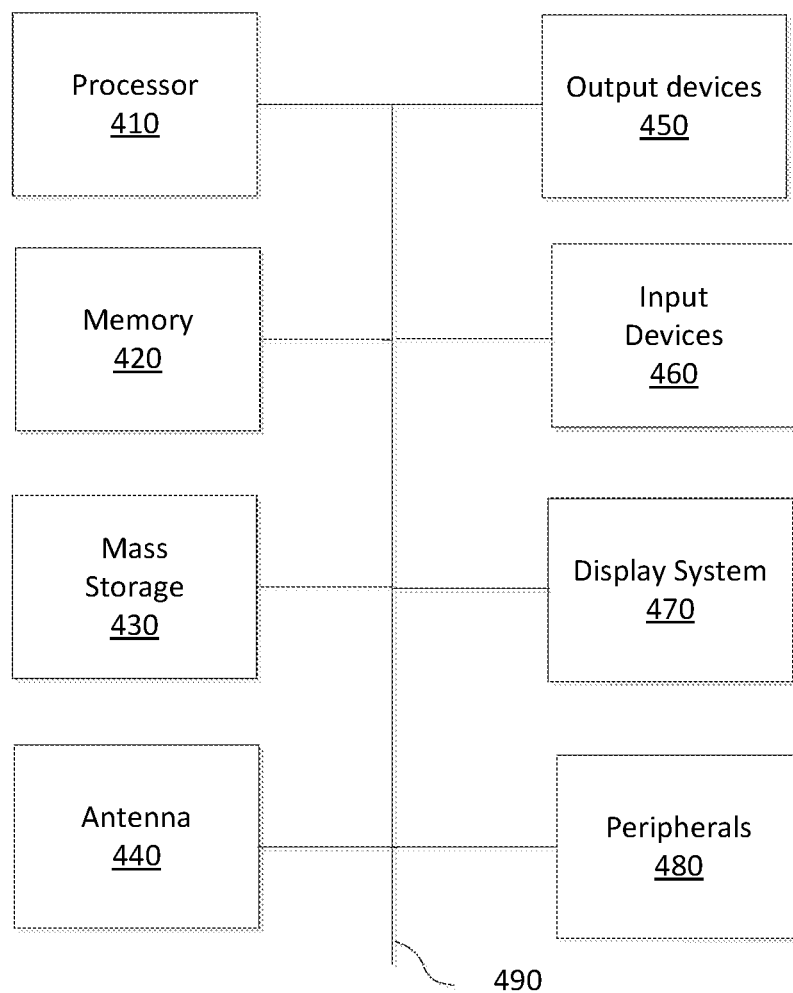
FIG. 4 is a block diagram of a device for implementing the present technology.

FIG. 4 is a block diagram of a device for implementing the present technology. FIG. 4 illustrates an exemplary computing system 400 that may be used to implement a computing device for use with the present technology. The computing system 400 of FIG. 4 includes one or more processors 410 and memory 420. Main memory 420 may store, in part, instructions and data for execution by processor 410. Main memory can store the executable code when in operation. The system 400 of FIG. 4 further includes a storage 420, which may include mass storage and portable storage, antenna 440, output devices 450, user input devices 460, a display system 470, and peripheral devices 480.

The components shown in FIG. 4 are depicted as being connected via a single bus 490. However, the components may be connected through one or more data transport means. For example, processor unit 410 and main memory 420 may be connected via a local microprocessor bus, and the storage 430, peripheral device(s) 480 and display system 470 may be connected via one or more input/output (I/O) buses.

Storage device 430, which may include mass storage implemented with a magnetic disk drive or an optical disk drive, may be a non-volatile storage device for storing data and instructions for use by processor unit 410. Storage device 430 can store the system software for implementing embodiments of the present invention for purposes of loading that software into main memory 410.

Portable storage device of storage 430 operates in conjunction with a portable non-volatile storage medium, such as a floppy disk, compact disk or Digital video disc, to input and output data and code to and from the computer system 400 of FIG. 4. The system software for implementing embodiments of the present invention may be stored on such a portable medium and input to the computer system 400 via the portable storage device.

Antenna 440 may include one or more antennas for communicating wirelessly with another device. Antenna 440 may be used, for example, to communicate wirelessly via Wi-Fi, Bluetooth, with a cellular network, or with other wireless protocols and systems. The one or more antennas may be controlled by a processor 410, which may include a controller, to transmit and receive wireless signals. For example, processor 410 execute programs stored in memory 420 to control antenna 440 transmit a wireless signal to a cellular network and receive a wireless signal from a cellular network.

The system 400 as shown in FIG. 4 includes output devices 450 and input device 460. Examples of suitable output devices include speakers, printers, network interfaces, and monitors. Input devices 460 may include a touch screen, microphone, accelerometers, a camera, and other device. Input devices 460 may include an alpha-numeric keypad, such as a keyboard, for inputting alpha-numeric and other information, or a pointing device, such as a mouse, a trackball, stylus, or cursor direction keys.

Display system 470 may include a liquid crystal display (LCD), LED display, or other suitable display device. Display system 470 receives textual and graphical information, and processes the information for output to the display device.

Peripherals 480 may include any type of computer support device to add additional functionality to the computer system. For example, peripheral device(s) 480 may include a modem or a router.

The components contained in the computer system 400 of FIG. 4 are those typically found in computing system, such as but not limited to a desk top computer, lap top computer, notebook computer, net book computer, tablet computer, smart phone, personal data assistant (PDA), or other computer that may be suitable for use with embodiments of the present invention and are intended to represent a broad category of such computer components that are well known in the art. Thus, the computer system 400 of FIG. 4 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The various methods may be performed by software operating in conjunction with hardware. For example, instructions executed by a processor, the instructions otherwise stored in a non-transitory computer readable medium such as memory. Various interfaces may be implemented—both communications and interface. One skilled in the art will appreciate the various requisite components of a mobile device and integration of the same with one or more of the foregoing figures and/or descriptions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A method for filtering routing assignment (RA) messages in a computer network, the method comprising:
   receiving login information from a computing device via an interface in a protected computer network, the computing device associated with a user;
   authenticating the computing device based on the received login information, wherein a record is stored that identifies the computing device as authenticated;
   receiving a first RA message over the protected computer network interface of one or more computer interfaces;
   extracting information from the first RA message;
   identifying that the extracted information from the first RA message corresponds to a stored record;
   identifying that information in the stored record corresponds to at least one of the computing device or the user, wherein the computing device is a personal device associated with the user communicating over the protected computer network interface;
   identifying that the information in the stored record is associated with an allowed source of RA messages based on the at least one of the computing device or the user being the allowed source of RA messages; and
   forwarding the first RA message to at least another computing device at the protected network based on the identification that the first RA message is associated with the allowed source of RA messages.

2. The method of claim 1, further comprising:
   receiving a second RA message over the protected computer network interface or another computer network interface of the one or more computer network interfaces;
   extracting information from the second RA message;
   identifying that the extracted information from the second RA message corresponds to a second stored record;
   identifying that information in the second stored record corresponds to at least one of a second computing device or second user;
   identifying that RA messages from the at least the second computing device or from a computing device associated with the second user are not allowed to be forwarded to other computers at the protected computer network; and
   blocking the second RA message, wherein the blocking of the second RA message includes not forwarding the second RA message.

3. The method of claim 1, wherein the identifying that the extracted information in the second RA message corresponds to the stored record is identified by comparing the extracted information with information included in the stored record.

4. The method of claim 3, wherein the information included in the stored record identifies at least one of a device user identifier (ID), a device machine identifier, a device Internet protocol (IP) address, and a timestamp.

5. The method of claim 1, wherein the information associated with the user identifies the user and identifies that RA messages associated with the user are allowed to be forwarded to the another computing device at the protected computer network.

6. The method of claim 1, wherein the authentication of the computing device includes verifying user credentials of the user before receiving the first RA message.

7. The method of claim 1, wherein the authentication of the computing device includes receiving a username and a password of the user.

8. The method of claim 6, further comprising storing information that identifies a time period over which RA messages associated with the user will be allowed, wherein the time period begins at the time when the user credentials are verified.

9. A non-transitory computer-readable storage medium having embodied thereon a program executable by a processor to perform a method for filtering routing assignment (RA) messages in a computer network, the method comprising:
   receiving login information from a computing device via an interface in a protected computer network, the computing device associated with a user;
   authenticating the computing device based on the received login information, wherein a record is stored that identifies the computing device as authenticated;
   receiving a first RA message over the computer network interface of one or more computer interfaces;
   extracting information from the first RA message;
   identifying that the extracted information from the first RA message corresponds to a stored record;
   identifying that information in the stored record corresponds to at least one of the computing device or the user, wherein the computing device is a personal device associated with the user communicating over the protected computer network interface;
   identifying that the information in the stored record is associated with an allowed source of RA messages based on the at least one of the computing device or the user being the allowed source of RA messages; and forwarding the first RA message to at least another computing device at the protected network based on the identification that the first RA message is associated with the allowed source of RA messages.

10. The non-transitory computer-readable storage medium of claim 9, the program further executable to:
receive a second RA message over the protected computer network interface or another computer network interface of the one or more computer network interfaces;
extract information from the second RA message;
identify that the extracted information from the second RA message corresponds to a second stored record;
identifying that information in the second stored record corresponds to at least one of a second computing device or second user;
identifying that RA messages from the at least the second computing device or from a computing device associated with the second user are not allowed to be forwarded to other computers at the protected computer network; and
block the second RA message, wherein the blocking of the second RA message includes not forwarding the second RA message.

11. The non-transitory computer-readable storage medium of claim 9, wherein the identifying that the extracted information in the second RA message corresponds to the stored record is identified by comparing the extracted information with information included in the stored record.

12. The non-transitory computer-readable storage medium of claim 11, wherein the information included in the stored record identifies at least one of a device user identifier (ID), a device machine identifier, a device internet protocol (IP) address, and a timestamp.

13. The non-transitory computer-readable storage medium of claim 9, wherein the information associated with the user identifies the user and identifies that RA messages associated with the user are allowed to be forwarded to the another computing device at the protected computer network.

14. The non-transitory computer-readable storage medium of claim 9, wherein the authentication of the computing device includes verifying user credentials of the user before receiving the first RA message.

15. The non-transitory computer-readable storage medium of claim 9, wherein the authentication of the computing device includes receiving a username and a password of the user.

16. The non-transitory computer-readable storage medium of claim 9, the program further executable to store information that identifies a time period over which RA messages associated with the user will be allowed, wherein the time period begins at the time when the user credentials are verified.

17. An apparatus for filtering routing assignment (RA) messages in a computer network, the apparatus comprising:
one or more network communication interfaces at a protected computer network, wherein login information is received from a computing device via a protected computer network interface of the one or more network communication interfaces,
a memory; and
a processor that executes instructions out of the memory to authenticate the computing device based on the received login information, wherein:
a record is stored that identifies the computing device as being authenticated,
a first RA message is received over the protected computer network interface, and
the processor further executes instructions out of the memory to:
extract information from the first RA message,
identify that the extracted information from the first RA message corresponds to a stored record,
identify that information in the stored record corresponds to at least one of the computing device or a user, wherein the computing device is a personal device associated with the user communicating over the protected computer network interface;
identify that the information in the stored record is associated with an allowed source of RA messages based on the at least one of the computing device or the user being the allowed source of RA messages, and
forward the first RA message to at least another computing device at the protected computer network based on the identification that the first RA message is associated with the allowed source of RA messages.

18. The apparatus of claim 17, wherein:
the network interface or another network interface of the one or more network interfaces receives a second RA message and the processor executing instructions out of the memory:
extracts information from the second RA message;
identifies that the extracted information from the second RA message corresponds to a second stored record;
identifies that information in the second stored record corresponds to at least one of a second computing device or second user;
identifies that RA messages from the at least second computing device or from a computing device associated with the second user are not allowed to be forwarded to the another computing device at the protected computer network; and
blocks the second RA message, wherein the blocking of the second RA message includes not forwarding the second RA message.

19. The apparatus of claim 17, wherein the identifying that the extracted information in the second RA message corresponds to the stored record is identified by comparing the extracted information with information included in the stored record.

20. The apparatus of claim 19, wherein the information included in the stored record identifies at least one of a device user identifier (ID), a device machine identifier, a device internet protocol (IP) address, and a timestamp.

* * * * *